United States Patent Office 2,929,199
Patented Mar. 22, 1960

2,929,199

BIPROPELLANTS

James N. Short, Borger, Tex., and Cleveland R. Scott, Bartlesville, Okla., assignors to Phillips Petroleum Company, a corporation of Delaware No Drawing. Application May 3, 1954
Serial No. 427,372

11 Claims. (Cl. 60—35.4)

This invention relates to hypergolic fuels. In one aspect this invention relates to materials, which when mixed with an oxidizer, exhibit hypergolic properties. In another aspect this invention relates to phosphonic diamides as hypergolic fuels. In another aspect this invention relates to polymers of phosphonic diamides as hypergolic fuels. In another aspect this invention relates to bipropellants wherein a phosphonic diamide or a polymer of a phosphonic diamide is an ingredient. In still another aspect this invention relates to bipropellants having a phosphonic diamide, or a polymer thereof, diluted with a non-hypergolic hydrocarbon, as an ingredient of said bipropellant. In still another aspect this invention relates to employing the compounds of the invention to develop thrust.

Various materials and combinations of materials have been found to be useful as rocket propellants and as propellants in jet propulsion systems. Some propellants consist of a single material, and are termed "monopropellants." Those propellants involving two materials are termed "bipropellants" and normally consist of an oxidizer and a fuel. When the fuel component of a bipropellant is spontaneously ignited upon contacting the oxidizer, the fuel is referred to as a "hypergolic" fuel. Hydrogen peroxide and nitromethane are each well known monopropellants. Well known bipropellants include hydrogen peroxide or liquid oxygen as the oxidizer with ammonia, hydrazine, hydrogen or ethyl alcohol-water as the fuel component; and nitric acid as the oxidizer with aniline or furfuryl alcohol as the hypergolic fuel component. The nitric acid can either be "white fuming nitric acid" or "red fuming nitric acid," the latter of which is made by dissolving from 6 to 20 or more percent by weight of nitrogen dioxide in the white fuming nitric acid.

According to the invention phosphonic diamides are hypergolic when admixed with an oxidizer. Thus, according to the invention there are provided hypergolic fuels comprising phosphonic diamides characterized by the structural formula

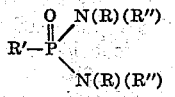

where R' is a monovalent hydrocarbon radical, R is selected from a group consisting of hydrogen and monovalent hydrocarbon radicals, R" is a member of a group consisting of hydrogen, monovalent hydrocarbon, amino, substituted amino, and phosphondiamido radicals, where, in addition, the N, R, and R" radicals together can form one of a five- and six-membered heterocyclic ring, the R and R" can be the same or different, the number of carbon atoms in R' does not exceed six and the number of carbon atoms in each of the R and R" radicals does not exceed ten. The hydrocarbon radicals may be cyclic or acyclic, straight or branch-chained, saturated, unsaturated, or aromatic, such as alkyl, aryl, cycloalkyl, alkaryl, aralkyl, alkenyl, cycloalkenyl, aralkenyl and alkenylaryl radicals. Polymers formed by polymerization of phosphonic diamides, where R, R' or R" contains one or more aliphatic unsaturated linkages are within the scope of this invention.

Further, according to the invention there are provided polymeric phosphonic diamides which exhibit hypergolic properties when admixed with an oxidizer. Said polymeric phosphonic diamides can be characterized by formulas including the following structural formulas. For example, linear polymers from N,N,N',N'-tetramethyl-1,3-butadiene-1-phosphonic diamide could, if polymerization occurs by 1,4-addition, be represented as having the following type of structure:

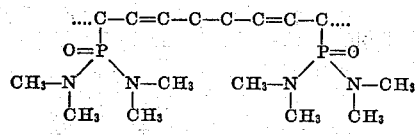

If polymerization occurs by 1,2-addition, then the structure could be

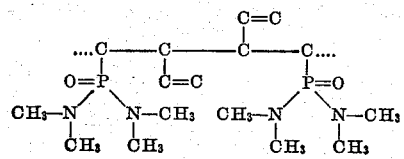

It is probable that both 1,2- and 1,4-addition will occur in the same molecule. Furthermore, in any instance where 1,2-addition occurs, the branching vinyl groups present are loci for further polymerization or cross-linking between polymer chains.

If in the above formulas, the methyl groups are replaced by allyl groups, further possibilities for polymerization or cross-linking would arise.

Still further according to the invention there is provided a method of using the hypergolic materials of the invention in a bipropellant which comprises the step of admixing said materials with an oxidizer to produce a sudden release of energy.

The phosphonic amides of the invention are hypergolic per se, and are also hypergolic when diluted with non-hypergolic combustible materials, even in a state of dilution as high as 70 to 80 percent or in some cases higher. Suitable nonhypergolic diluents include hydrocarbon fuels such as gasoline, toluene, various hydrocarbons such as n-heptane, jet fuel and the like. The compounds of the invention can also be mixed with other hypergolic materials such as certain organic amines, conjugated diolefins, sulfides, and the like. They can be used as substantially pure compounds, as isomeric mixtures, or as mixtures of more than one phosphonic diamide.

Illustrative of the hypergolic organic phosphonic amides of our invention are

N,N,N',N'-tetramethyl-1,3-butadiene-1-phosphonic diamide,
N,N,N',N'-tetradecyl-1,3-butadiene-2-phosphonic diamide,
N,N,N',N'-tetraallyl-1,3-butadiene-1-phosphonic diamide,
N,N,N',N'-tetra-2-pentenyl-1,3-butadiene-2 - phosphonic diamide,
N,N,N',N'-tetrabenzyl-1,3-cyclohexadiene-1 - phosphonic diamide,
N,N,N',N'-tetraoctyl-1,3-cyclohexadiene-2-phosphonic diamide,
N,N,N',N'-tetraphenylethanephosphonic diamide,
N,N,N',N'-tetracyclohexyl-2-methyl-1-propene - 1 - phosphonic diamide,
N,N,N',N'-tetra-2-cyclohexenyl-2-methyl-1 - propene - 2-phosponic diamide,
N,N'-diethylbenzenephosphonic diamide, N,N'-diperidylethanephosphonic diamide,
1,3-butadiene-1-phosphonic dihydrazide

[CH$_2$=CH—CH=CH—P(O)(NHNH$_2$)$_2$]

1,3-butadiene-2-phosphonic dihydrazide,
N,N'-ethylene-1-butene-1-phosphonic diamide

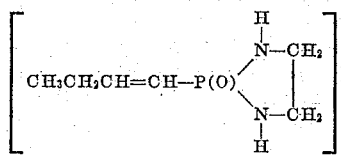

N,N'-ethylene-1-butene-2-phosphonic diamide, 1,3-butadiene-1-phosphonic di(2-phenylhydrazide)

[CH$_2$=CH—CH=CH—P(O)(NHNHC$_6$H$_5$)$_2$]

1,3-butadiene-2-phosphonic di(2-phenylhydrazide), hydrazobis(1,3-butadiene-1-phophonic hydrazide)

[CH$_2$=CH-CH=CH-P(O)-NH-NH-P(O)-CH=CH-CH=CH$_2$]
        |                          |
       NH                         NH
        |                          |
       NH$_2$                      NH$_2$ hydrazobis(1,3-butadiene-2-phosphonic hydrazide), N,N'-1,3-butadiene-1-phosphonylphenylene diamine

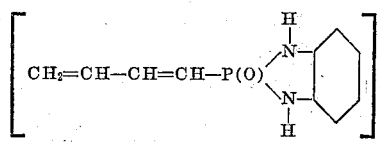

and N,N'-1,3-butadiene-2-phosphonylphenylenediamine. Other suitable phosphonic amides are cyclic compounds in which two phosphorus atoms are linked by two hydrazo radicals. These compounds are represented by the formula

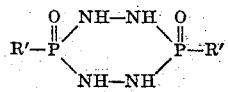

Examples are

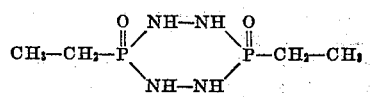

and

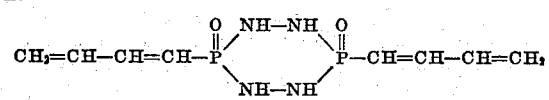

Possible isomers of these phosphonic amides also come within the scope of this invention, as well as polymers formed from the phosphonic amides. A presently preferred group of phosphonic diamides are the phosphonic diamides and polymers thereof, the method of preparation and composition of which are disclosed and claimed in copending application Serial No. 425,770, filed April 26, 1954, now Patent No. 2,818,406, more especially the alkapolyene, alkenyne and alkapolyyne phosphonic diamides disclosed and claimed therein. Throughout the specification and in the claims: the term alkene means a hydrocarbon radical containing at least one ethylenic linkage; the term alkapolyene means a hydrocarbon radical containing at least two ethylenic linkages; the term alkenyne means a hydrocarbon radical containing at least one ethylenic linkage and at least one acetylenic linkage; and the term alkapolyyne means a hydrocarbon radical containing at least two acetylenic linkages. Thus, one example of an alkapolyene phosphonic diamide is N,N,N',N'-tetramethyl-1,3-butadiene-1-phosphonic diamide. Numerous other examples are given elsewhere herein. Examples of alkenyne phosphonic diamides are N,N,N',N'-tetraallyl-3-buten-1-yne-1-phosphonic diamide, and N,N,N',N'-tetraallyl-1-butene-3-yne-1-phosphonic diamide.

Examples of alkapolyyne phosphonic diamides are N,N,N',N'-tetracyclohexyl-1,3-pentadiyne-1-phosphonic diamide, and N,N,N',N'-tetra-(decyl)-7-octen-1,3-diyne-1-phosphonic diamide.

The hypergolic compounds of our invention can be prepared in any suitable manner. One method for the preparation of certain of these amides is to react an organic phosphonic dihalide at a temperature of 0° to —70° C. with at least four or five molecular equivalents of an amine, the quantity depending on whether dehydrohalogenation is to take place simultaneously with the amidation, or not. Suitable phosphonic dihalides for this reaction are 2-chloro-3-butene-1-phosphonic dichloride,
1-chloro-3-butene-2-phosphonic dichloride,
4-chloro-2-butene-1-phosphonic dichloride,
2-chloro-3-cyclohexene-1-phosphonic dichloride,
1-chloro-3-cyclohexene-2-phosphonic dichloride,
4-chloro-2-cyclohexene-1-phosphonic dichloride,
ethanephosphonic dichloride,
2-methyl-2-chloropropane-1-phosphonic dichloride,
2-methyl-1-chloropropane-2-phosphonic dichloride,
benzenephosphonic dichloride and the like. Isomeric mixtures of the phosphonic dihalides may be used in the reaction.

The phosphonic dihalides used can be any of those disclosed and claimed in co-pending application Serial No. 425,769, filed April 26, 1954, now Patent No. 2,871,263, which have a hydrogen atom attached to the same carbon atom to which the phosphorus atom is attached. As stated in that application, they are prepared by reacting the corresponding haloalkenephosphorus tetrachloride with a carboxylic acid. Thus, 2-chloro-3-butenephosphorus tetrachloride, which is a preferred starting material, is reacted with acetic acid in accordance with the following equation:

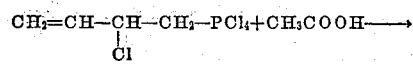

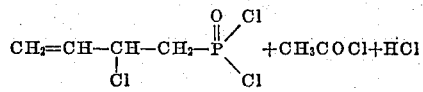

As stated in the application Serial No. 425,769, filed April 26, 1954, now Patent No. 2,871,263, when 1,3-butadiene is reacted with phosphorus pentachloride to form a chlorobutenephosphorus tetrachloride three possible isomers can be obtained, i.e.,

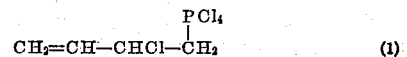  (1)

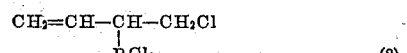  (2)

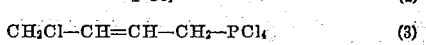  (3)

At present it is believed that isomer No. 1, above, predominates. When a mixture of the said isomers is reacted with a carboxylic acid according to the above given equation a mixture of the corresponding chlorobutenephosphonic dichlorides is obtained. Thus, when a mixture of the said chlorobutenephosphonic dichlorides is used as a starting material in the reaction with an unsaturated amine such as diallylamine the corresponding alkadienephosphonic diamides are obtained, i.e.,

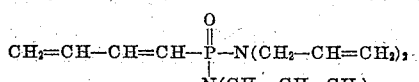

N,N,N',N'-tetraallyl-1-3-butadiene-1-phosphonic diamide

N,N,N',N'-tetraallyl-1-3-butadiene-2-phosphonic diamide

When vinyl acetylene is reacted with phosphorus pentachloride to form a chlorobutadienephosphorus tetrachloride one of the isomers which can be obtained has the following structure:

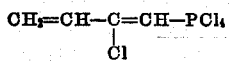

When this isomer is reacted with a carboxylic acid according to the above given equation the corresponding chlorobutadienephosphonic dichloride is obtained. Thus, when the said chlorobutadienephosphonic dichloride is used as a starting material in the reaction with an unsaturated amine such as diallylamine 2-chloro-1,3-butadiene-1-phosphonic diamide will be obtained. By dehydrohalogenation with a strong base such as potassium hydroxide the corresponding alkenynephosphonic diamide is obtained, i.e.,

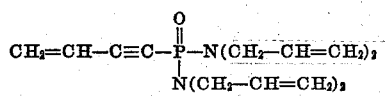

N,N,N',N'-tetraallyl-3-butene-1-ynephosphonic diamide

The amines which can be used in this preparative method can be primary or secondary aromatic or secondary aliphatic, carbocyclic, or heterocyclic monoamines or polyamines. Hydrazine and its derivatives are also applicable. Illustrative of such amines or hydrazines are dimethylamine, diallylamine, dibenzylamine, diphenylamine, dicyclohexylamine, aniline, piperidine, hydrazine, N,N'-dimethylethylenediamine, phenylhydrazine, o-phenylenediamine, N-methylaniline and the like. When the amine used is a polyamine, the reaction can proceed through multiple condensation reactions to yield a cross-linked polymer. N,N'-dimethylethylenediamine, for example, forms a polymer which can be represented by the formula:

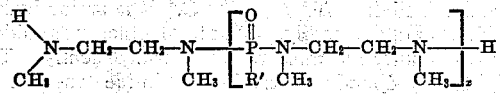

where $x$ is equal to a whole number and R' is as defined earlier. It is generally accepted that in order to form linear polymers, each of the reactants must be capable of reacting with the others at more than one point in the molecule, but if one of the reactants can undergo reaction at more than two points, the initial linear structures will probably be joined through cross-linkages, and three dimensional structures will result. The polymeric products of this type are also within the scope of this invention.

When one of the reactants in the preparation of the phosphonic amide contains an olefinic double bond, the phosphonic amide formed is capable of undergoing addition polymerization to yield linear polymeric phosphonic amides which also are hypergolic. For example, the phosphonic amide formed from the isomeric chlorobutene phosphonic dichlorides and diallylamine polymerizes to yield a hypergolic resinous material.

In addition to white or red fuming nitric acid, other suitable oxidizers can be used in the bipropellants of our invention, particularly other oxidizers such as hydrogen peroxide, liquid ozone, liquid oxygen and mixed acids, particularly mixtures of nitric acid and sulfuric acid. It is within the scope of this invention to employ, preferably dissolved in the oxidizer, ignition catalysts or oxidation catalysts. These oxidation catalysts include certain metal salts such as the chlorides and naphthenates of iron, zinc, cobalt and similar heavy metals.

The following examples are illustrative of the invention.

EXAMPLE I

The unsaturated organic phosphonic diamides listed below were tested for spontaneous ignition, employing both white fuming nitric acid (WFNA) and red fuming nitric acid (RFNA) as the oxidizer. In each test, 0.13 ml. of a mixture of isomeric phosphonic diamides with varying percentages of pure grade n-heptane or toluene was dropped into a 1" x 8" test tube containing 0.3 ml. of either white or red fuming nitric acid. The mixture of the organic phosphonic diamides and hydrocarbon, upon coming into contact with the fuming nitric acid, ignited spontaneously. Normal heptane was employed as a diluent to determine the maximum amount of dilution that the phosphonic diamides could tolerate and still retain the property of being hypergolic. When the hypergol was not soluble in n-heptane, toluene was used as the diluent. Tests were conducted at room temperature, i.e., about 70° F., and at −40° F. In Table 1 below are given the maximum dilutions at which the phosphonic diamides retained their self-ignition properties.

EXAMPLE II

The organic phosphonic diamides tabulated below were tested for "ignition delay," which may be broadly defined as the time interval between contact of the oxidizer with the fuel and the beginning of sustained combustion. Long ignition delays are undesirable, as they may be the cause of hard starts, rough burning, and frequently, destructive explosions. In Table 2 is given a summary of ignition delay data obtained in the drop test apparatus, using white fuming nitric acid as the oxidant. The drop test apparatus comprises an injection nozzle activated by a solenoid coil which is used to inject acid into a small quantity of fuel contained in the bottom of a test tube. The ignition delay interval is taken as the time between contact of the acid and fuel and the presence of flame as sensed by a photocell. The values were obtained by averaging at least six runs on each fuel.

*Table 1*

| Material | Maximum Percentage Dilution with n-Heptane | | Maximum Percentage Dilution with Toluene | | | |
| --- | --- | --- | --- | --- | --- | --- |
| | Room Temperature | | Room Temperature | | −40° F. | |
| | RFNA | WFNA | RFNA | WFNA | RFNA | WFNA |
| Isomeric N,N,N',N'-tetramethyl-1,3-butadienephosphonic diamides | 70 | 60 | | | 60 | 50 |
| Isomeric N,N,N',N'-tetraallyl-1,3-butadienephosphonic diamides | 70 | 80 | | | 60 | 60 |
| Isomeric N,N,N',N'-tetraallyl-1,3-butadienephosphonic diamides (crude reaction mixture) | | | 80 | 70 | 60 | 60 |

Table 2
SUMMARY OF IGNITION DELAY DATA WITH WHITE FUMING NITRIC ACID

| | Drop Test Apparatus | | | | | |
|---|---|---|---|---|---|---|
| | 75° F. | | | −40° F. | | |
| | Average Ignition Delay, Millisec. | Average Deviation, Millisec. | Percent Deviation | Average Ignition Delay, Millisec. | Average Deviation, Millisec. | Percent Deviation |
| Isomeric N,N,N',N'-tetraallyl-1,3-butadienephosphonic diamides | 33 | 2.9 | 8.8 | 925 | 308.4 | 33.3 |
| Isomeric N,N,N',N'-tetramethyl-1,3-butadienephosphonic diamides | 44 | 3.8 | 8.6 | | | |
| Isomeric N,N,N',N'-tetramethyl-1,3-butadienephosphonic diamides | 17 | 2.6 | 15.3 | 341 | 171.6 | 50.4 |
| Isomeric N,N,N',N'-tetramethyl-1,3-butadienephosphonic diamides+10% toluene | 34 | 1.8 | 5.3 | | | |
| Isomeric N,N,N',N'-tetramethyl-1,3-butadienephosphonic diamides+20% toluene | 43 | 1.8 | 4.2 | | | |

EXAMPLE III

The isomeric N,N,N',N'-tetraallyl-1,3-butadienephosphonic diamides were prepared by the following procedure:

To a solution of 107 g. (1.1 mol) of anhydrous diallylamine in 100 ml. of anhydrous ether, cooled to about −50° F., was added dropwise, with constant stirring, 41.5 g. (0.2 mol) of the chlorobutenephosphonic dichloride, the preparation of which is described and claimed in copending application Serial No. 425,769, filed April 26, 1954, now Patent No. 2,871,263. When all of the phosphonic dichloride had been added, the flask was warmed gently to room temperature, and the reaction was allowed to proceed with intermittent cooling to keep the temperature below 40° C., until, after about one hour, cessation of heat evolution indicated that the reaction had proceeded substantially to completion. The precipitate of amine hydrochloride was removed by filtration, washed with ether, and dried. The ether was removed from the filtrate by distillation, and 100 ml. of n-pentane was added to precipitate the remaining amine hydrochloride, which was removed by filtration. The combined weights of the amine hydrochloride indicated a 98.5 percent yield of the theoretical total yield. Pentane and excess amine were stripped from the filtrate by distillation in vacuo, and the residue was distilled to yield N,N,N',N'-tetraallyl-1,3-butadienephosphonic diamide, boiling at 157 to 170° C. at 1 mm. of Hg. Polymer formation occurred in the flask.

A sample prepared by a procedure similar to the one described above gave the following analysis:

Calculated for $C_{16}H_{25}PON_2$: C, 65.7; H, 8.6; P, 10.6. Found: C, 63.2; H, 8.9; P, 10.3.

EXAMPLE IV

The isomeric N,N,N',N'-tetramethyl-1,3-butadienephosphonic diamides were prepared by the following procedure:

To 100 g. of anhydrous dimethylamine, cooled in an acetone-Dry Ice bath, was added with stirring 41.5 g. of chlorobutenephosphonic dichloride, prepared as described and claimed in co-pending application Serial No. 425,769, filed April 26, 1954, now Patent No. 2,871,263. The mixture was then allowed to warm to room temperature, and the excess dimethylamine was driven off by gentle heating. After adding 50 cc. of ether, the amine hydrochloride was removed by filtration, and washed with 100 cc. of ether. 46 g. of dimethylamine hydrochloride was obtained. The ether was removed from the filtrate and the residue was distilled in vacuo to yield 21.5 g. of N,N,N',N'-tetramethyl-1,3-butadiene- phosphonic diamide, boiling at 102–120° C. at 1.25–2.5 mm. The residue remaining in the distillation flask was a clear, amber resin.

EXAMPLE V

A second run was made for the purpose of preparing additional isomeric N,N,N',N'-tetramethyl-1,3-butadienephosphonic diamides. 100 g. (2.22 mol) of anhydrous dimethylamine was placed in a 500 cc. 3-necked flask, equipped with stirring unit, dropping funnel, and thermometer. It was cooled to −70° C. by means of a Dry Ice-acetone bath, and then into it was dropped slowly 42.5 g. (0.205 mol) of chlorobutenephosphonic dichloride which was prepared according to the procedure described in Example II of co-pending application, Serial No. 425,769, filed April 26, 1954, now Patent No. 2,871,263. During this addition the temperature was maintained at −70° to −40° C. The amine hydrochloride separated readily. 50 cc. of ether was added. After two hours, the mixture was warmed gently. The precipitate of dimethylamine hydrochloride was filtered and washed well. 44.6 g., an 88.8% theoretical yield, was obtained. The filtrate, which was a clear yellow oil, was stripped of ether, and then distilled under reduced pressure. 20.7 g. of a fraction boiling at 116–118 at 0.9 to 1.2 mm. Hg was obtained. This represents a theoretical yield of 53.7%. Its refractive index was $N_D^{20}$ 1.5023.

EXAMPLE VI

A 500 cc. flask equipped with dropping funnel, stirring unit, and reflux condenser was placed in a Dry Ice-acetone bath. 107 g. (1.1 mols) of distilled diallylamine was agitated in the flask. Into this was dropped slowly 41.5 g. (0.20 mol) of chlorobutenephosphonic dichloride (prepared as described in Example I of co-pending application, Serial No. 425,769, filed April 26, 1954) dissolved in 100 cc. of ether. The reaction was exothermic with ready separation of the amine hydrochloride. 50 cc. more of ether was added and the mass filtered. The filtrate and 500 cc. of ether washings were combined. A faint cloud of precipitate settled slowly. The diallylamine hydrochloride was dried for 3 hours at 105° C. and then weighed. 72.9 g. were obtained, a 91% theoretical yield. The filtrate was stripped to 50° C. under reduced pressure. 62.2 g. of a red, very viscous, jellylike oil remained. When it was attempted to distill 61.1 g. of this crude product at reduced pressure, 14.89 of diallylamine and 2.5 g. of a liquid boiling at 25° C. at 0.45 mm. Hg were obtained as overhead while polymerization occurred in the flask to yield 43.3 g. of a dark plastic solid. The crude product, the distilled product, and the polymer were all hypergolic with white fuming nitric acid and red fuming nitric acid.

Not all nitrogen containing compounds are hypergolic. The following tabulation illustrates results obtained when testing the listed compounds for hypergolicity in accordance with the method given in Example 1.

EXAMPLE VII

| Material | Undiluted. Room Temperature | | Maximum Percentage Dilution With n-Heptane | | | |
|---|---|---|---|---|---|---|
| | RFNA | WFNA | Room Temp. | | −40° F. | |
| | | | RFNA | WFNA | RFNA | WFNA |
| 3-Amino-n-octane | NI* | NI | | | | |
| 2,5-Diethylpyridine | NI | NI | | | | |
| N,N'-di(α-methylbenzyl) ethylenediamine | NI | NI | | | | |
| 2-Amino-2-methyl-1-propanol | NI | NI | | | | |
| 3-Isopropoxypropyl amine | | | 10 | 10 | NI | NI |
| 2-Amino-4-methylpentane | | | 10 | NI | NI | NI |

*NI=no ignition.

While certain polymers have been represented herein by structural formulas it should be understood that all stages of polymerization, i.e., from substantially unpolymerized to substantially completely polymerized, of the compounds of the invention are within the scope of the invention.

Although there is no reason to suspect that the structural formulas given as representing the materials of the invention are incorrect, since said formulas were developed according to standard methods well known to those skilled in the art, the invention is not to be unduly limited by said formulas.

In the specification and in the appended claims the term "bipropellant" means a material of the invention plus an oxidizer, in which spontaneous combustion takes place to provide a sudden release of energy as a result of contact of said material and said oxidizer; "hypergolic" or "hypergolicity" is the property of a material characterized by spontaneous ignition to provide a sudden release of energy when the material is contacted with an oxidizer and an oxidizer is a material which causes spontaneous ignition of the compounds of the invention upon contact therewith.

Reasonable variation and modification are possible within the scope of the foregoing disclosure and the appended claims to the invention the essence of which is that phosphonic diamides and/or polymeric phosphonic diamides are hypergolic when admixed with an oxidizer.

We claim:
1. A method for imparting immediate thrust to a mass, comprising introducing separate streams of an oxidizer component and a fuel component into contact with each other in a combustion chamber of a reaction motor in such proportion as to produce spontaneous ignition, said fuel component being selected from the group consisting of a phosphonic diamide and a polymer of said diamide, wherein said diamide is characterized by the structural formula

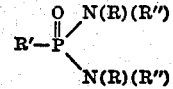

where R' is a monovalent hydrocarbon radical, R is selected from the group consisting of hydrogen and monovalent hydrocarbon radicals, R" is selected from the group consisting of hydrogen, monovalent hydrocarbon, amino, phenyl substituted amino, and phosphondiamido radicals, where, the R and R" can be different, the number of carbon atoms in R' does not exceed six and the number of carbon atoms in each of the R and R" radicals does not exceed ten.

2. A method according to claim 1 wherein said phosphonic diamide is a mixture of isomeric N,N,N',N'-tetramethyl-1-3-butadiene phosphonic diamides.

3. A method according to claim 1 wherein said phosphonic diamide is N,N,N',N'-tetramethyl-1-3-butadiene-1-phosphonic diamide.

4. A method according to claim 1 wherein said phosphonic diamide is N,N,N',N'-tetramethyl-1-3-butadiene-2-phosphonic diamide.

5. A method according to claim 1 wherein said phosphonic diamide is N,N,N',N'-tetraallyl-1-3-butadiene-1-phosphonic diamide.

6. A method according to claim 1 wherein said phosphonic diamide is N,N,N',N'-tetraallyl-1-3-butadiene-2-phosphonic diamide.

7. A method according to claim 1 wherein said phosphonic diamide is a mixture of isomeric N,N,N',N'-tetraallyl-1-3-butadienephosphonic diamides.

8. A method according to claim 1 wherein said phosphonic diamide is a polymeric N,N,N',N'-tetraallyl-1-3-butadienephosphonic diamide.

9. A method according to claim 1 wherein said phosphonic diamide is a polymeric N,N,N',N'-tetramethyl-1-3-butadienephosphonic diamide.

10. A method according to claim 1 wherein said oxidizer is selected from the group consisting of white fuming nitric acid, red fuming nitric acid, hydrogen peroxide, liquid oxygen, liquid ozone, and mixtures of nitric and sulfuric acids.

11. A method according to claim 1 wherein said phosphonic diamide is dissolved in a non-hypergolic combustible material selected from the group consisting of toluene, n-heptane, gasoline and liquid hydrocarbon jet fuel.

References Cited in the file of this patent

UNITED STATES PATENTS

| 2,382,309 | Hamilton | Aug. 14, 1945 |
| 2,666,750 | Dickey | Jan. 19, 1954 |